(12) United States Patent
Johannessen

(10) Patent No.: US 6,684,015 B2
(45) Date of Patent: Jan. 27, 2004

(54) METHOD OF SELF-ALIGNING OPTICAL WAVEGUIDES

(75) Inventor: Kjetil Johannessen, Trondheim (NO)

(73) Assignee: Intel Corporation, Santa Clara, CA (US)

(*) Notice: Subject to any disclaimer, the term of this patent is extended or adjusted under 35 U.S.C. 154(b) by 89 days.

(21) Appl. No.: 10/041,014

(22) Filed: Dec. 28, 2001

(65) Prior Publication Data

US 2003/0123807 A1 Jul. 3, 2003

(51) Int. Cl.$^7$ .................................................. G02B 6/26
(52) U.S. Cl. ............................ 385/52; 385/49; 385/50; 385/88
(58) Field of Search ............................... 385/52, 49, 14, 385/50, 88, 89, 132, 137; 156/272.8

(56) References Cited

U.S. PATENT DOCUMENTS 5,073,002 A * 12/1991 Hockaday ..................... 385/49

* cited by examiner

Primary Examiner—Phan T. H. Palmer
(74) Attorney, Agent, or Firm—Charles K. Young

(57) ABSTRACT

A first waveguide and a second waveguide are aligned by applying an alignment dot on end surfaces of the cores of first and second waveguides. The alignment dots are positioned in close proximity to one another, and are melted together. Surface tension pulls the first and second waveguides into alignment.

27 Claims, 5 Drawing Sheets

METHOD OF SELF-ALIGNING OPTICAL WAVEGUIDES

BACKGROUND OF THE INVENTION

1. Field of the Invention

The described invention relates to the field of optical circuits. In particular, the invention relates to a method of self-aligning optical waveguides.

2. Description of Related Art

Aligning optical waveguides can be difficult. If the waveguides are the same, such as two optical fibers, they can be fused together without too much difficulty. However, if the waveguides are made from dissimilar materials, or have different cross-sectional shapes, it is more difficult to align the waveguides.

DETAILED DESCRIPTION

A method of self-aligning two waveguides is described. A first waveguide and a second waveguide are aligned by applying an "alignment dot," i.e., a small portion of optical material, e.g., a thermal polymer, on the end surfaces of the cores of first and second waveguides. The alignment dots are positioned in close proximity to one another, and are melted together. Surface tension pulls the first and second waveguides into alignment. The method may be used for waveguides having dissimilar cross-sectional shapes, or for waveguide comprising dissimilar materials. In one embodiment, an optical fiber is aligned to a planar waveguide. The method may be employed for aligning multiple waveguides at the same time, such as in aligning an optical fiber ribbon with a planar lightwave circuit.

Figure 1:
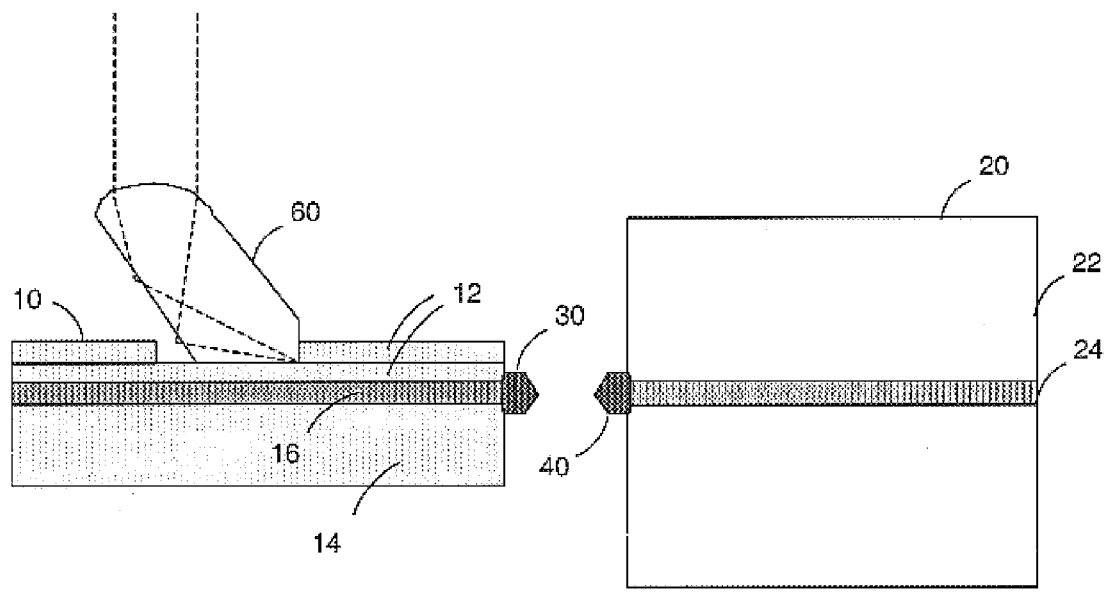
FIG. 1 is a schematic diagram showing a cross-sectional view of two waveguides being aligned using alignment dots.

FIG. 1 is a schematic diagram showing a cross-sectional view of two waveguides being aligned using alignment dots. In one embodiment, the first waveguide is a planar waveguide 10, and the second waveguide is an optical fiber 20. The planar waveguide comprises an upper cladding 12, a lower cladding 14 and a core 16. An alignment dot 30 has been applied to the end surface of the core 16 of the planar waveguide 10, as will be described in more detail with respect to FIGS. 3A–3D and 4A–4E.

The optical fiber 20 comprises an outer cladding 22 and a core 24. An alignment dot 40 has been applied to an end surface of the core 24 of the optical fiber 20, as will be described in more detail with respect to FIGS. 3A–3D and 4A–4E.

In order to align the planar waveguide 10 with the optical fiber 20, their alignment dots 30, 40 are placed in close proximity with one another. The alignment dots are then heated until they melt together. At least one of the waveguides 10, 20 is allowed to move as the alignment dots melt, and the surface tension of the alignment dots pulls the waveguides 10, 20 into alignment with one another.

Figure 2:
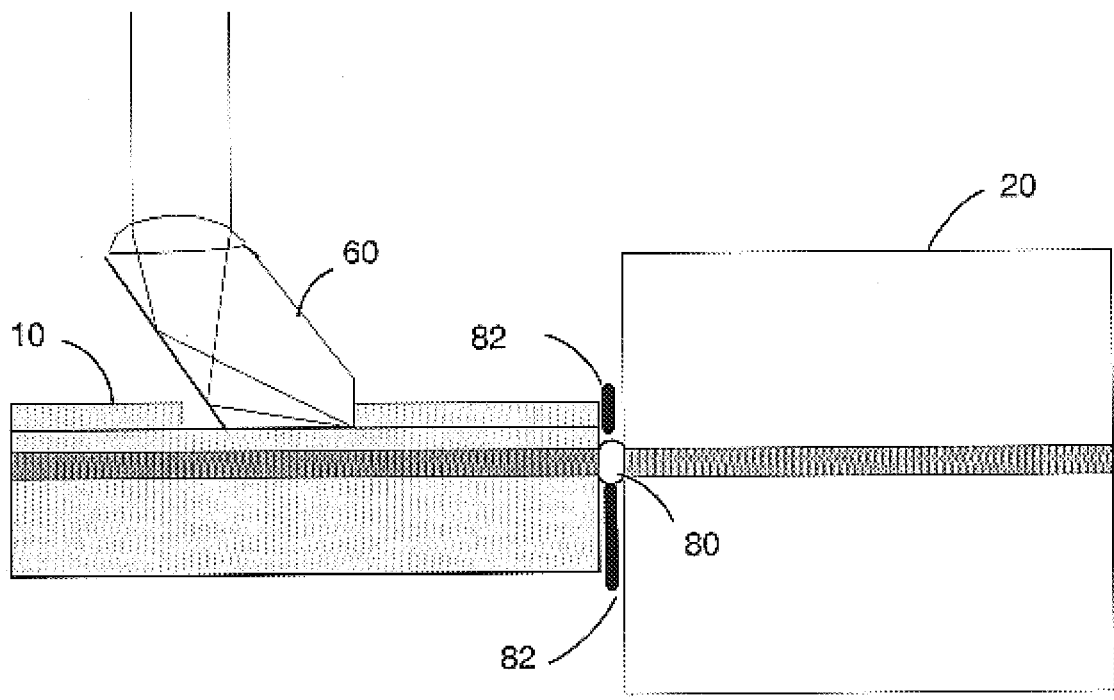
FIG. 2 is a schematic diagram showing a cross-sectional view of the two waveguides after being aligned by heating the alignment dots that have melted together.

FIG. 2 is a schematic diagram showing a cross-sectional view of the two waveguides 10, 20 after being aligned by heating the alignment dots 80 that have been melted together. In one embodiment, a bonding agent 82 is applied between and/or around the two waveguides 10, 20 to strengthen the bond between the two waveguides 10, 20 and prevent them from subsequently shifting and becoming misaligned.

Figure 3A:
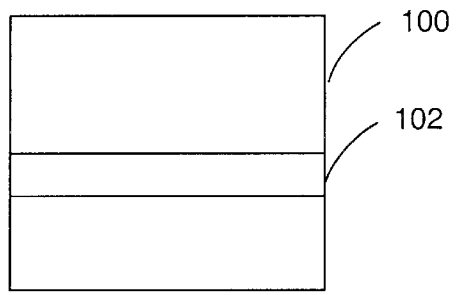
FIGS. 3A–3D are schematic diagrams showing the process of applying an alignment dot to a waveguide.

FIGS. 3A–3D are schematic diagrams showing the process of applying an alignment dot to a waveguide 100. FIG. 3A is a cross-sectional view of a waveguide 100 having a core 102. The process of applying the alignment dot is substantially the same whether the waveguide 100 is an optical fiber or a planar waveguide.

Figure 3C:
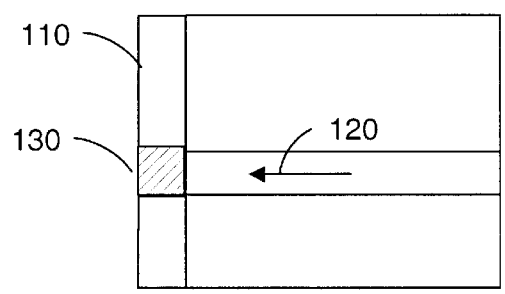
Figure 3B:
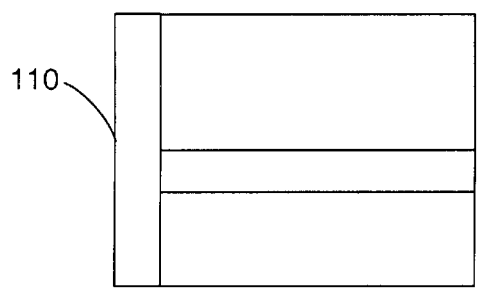

FIG. 3B is a schematic diagram that shows a photo sensitive polymer layer 110 applied to an end surface of the waveguide 100. The photo sensitive polymer layer may be applied by any of various deposition techniques. For example, in one embodiment, the photo sensitive polymer layer is spin coated on the end surface of the waveguide 100. In another embodiment, the waveguide 100 is coated by dipping it into the photo sensitive polymer.

FIG. 3C shows the polymer layer 110 being exposed to a light beam 120 traveling through the waveguide 100. A portion 130 of the photo sensitive polymer is cured by the light beam. In one embodiment, the light beam is of an ultraviolet (UV) wavelength. Alternatively the light beam may be in the visible spectrum, e.g, of approximately 630 nm or shorter. However, the polymer can be selected to be cured by other wavelengths.

Figure 3D:
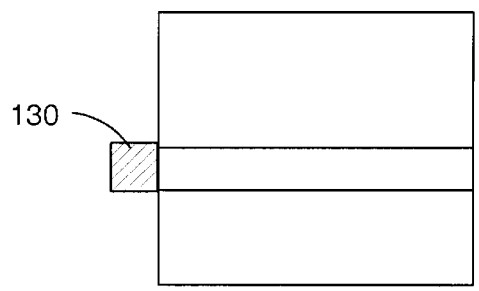

FIG. 3D shows the cured portion 130 of the polymer layer 110 after the uncured portion of the polymer layer 110 has been removed. The uncured portion of polymer may be removed by using a solvent or an etch. The cured portion 130 is the alignment dot.

Figure 4A:
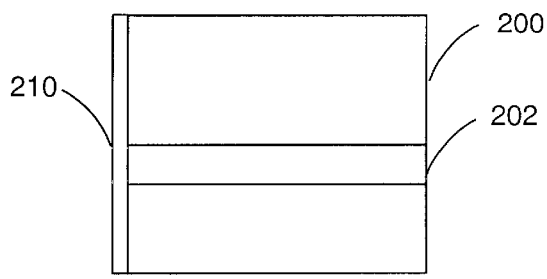
FIGS. 4A–4E are schematic diagrams showing an alternate embodiment of applying an alignment dot to a waveguide having a core.

FIGS. 4A–4E are schematic diagrams showing an alternate embodiment of applying an alignment dot to a waveguide 200 having a core 202. FIG. 4A is a cross-sectional view of a waveguide 200 after a masking layer 210 has been applied to the end surface of the waveguide 200. In one embodiment, the masking layer comprises a polymer.

Figure 4D:
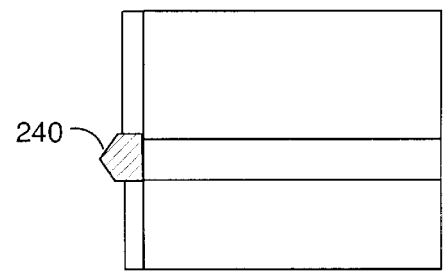
Figure 4B:
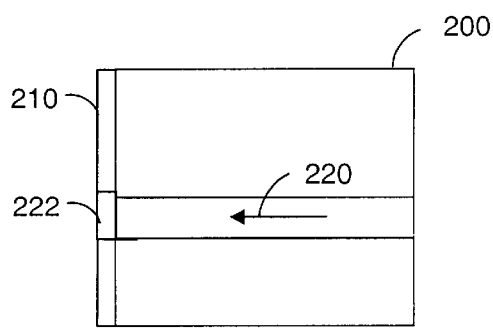

FIG. 4B shows the masking layer 210 of polymer being exposed to a light beam 220 traveling through the waveguide 200. The light beam 220 is a high energy light beam that causes ablation of an area 222 of the masking polymer 210 in the guided mode of the waveguide 200.

Figure 4E:
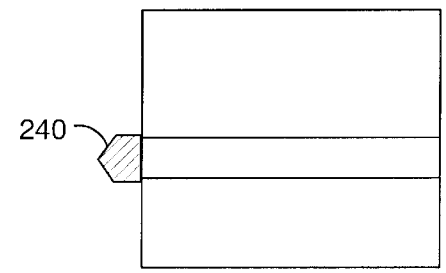
Figure 4C:
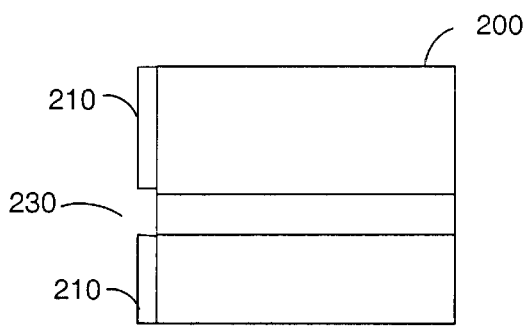

FIG. 4C shows the waveguide 200 and masking layer 210 after the ablation is complete. A mask opening 230 has been created by the ablation.

FIG. 4D shows the mask opening 230 filled with an optical material, such as a thermal polymer 240. This can be accomplished by various methods. In one embodiment, a small amount of polymer material is placed in the opening 230 and around the opening. The material is melted and allowed to enter into the opening 230. The resulting dot may be larger than the thickness of the masking layer. In some cases, the resulting dot may be significantly larger than the thickness of the masking layer. In another embodiment, the whole end surface of the waveguide 200 is covered with the thermal polymer, e.g., by dip-coating, and the thermal polymer fills up the opening 230.

FIG. 4E shows the thermal polymer 240 after the masking layer 210 has been removed, e.g., by an etch or a solvent.

The alignment dot has been formed. Depending on the thickness of the masking layer 210 and the thickness of the thermal polymer 240, the masking layer 210 may optionally be left on the end surface of the waveguide.

With respect to the photo ablation method of FIGS. 4A–4E, in one embodiment, the end surface of the waveguide may be chemically treated, e.g., with silane or hydrofluoric acid, to modify the characteristics of the surface to allow the polymer to form a small drop. After both the photo curing and the photo ablation processes, the waveguide may be pre-baked to improve adhesion of the alignment dot to the end surface of the waveguide.

In both the photo curing method (FIGS. 3A–3D) and the photo ablation method (FIGS. 4A–4E), a light beam was directed through the waveguide. Returning to FIG. 1, one way of transmitting a light beam into the core 16 of the planar waveguide 10 is by coupling an optical probe 60 to the waveguide 10. In one embodiment, a portion of the upper cladding 12 of the waveguide 10 is removed so that the optical probe 60 may be coupled to the waveguide with less than approximately 3 microns of cladding. For example, the upper cladding of the planar waveguide may be selectively etched off over the waveguide 10. Alternatively, the optical probe 60 may be coupled to a planar waveguide that either has no upper cladding or has only a very thin upper cladding. Additionally, an index-matched fluid may be used to better couple the optical probe 60 to the planar waveguide 10. The angle of the probe, its refractive index, and the angle of light input to the probe allow selection of the fundamental mode within the waveguide 10.

In one embodiment, an UV light is used for the photo curing and photo ablation methods. One problem with using a UV light guided through the planar waveguide 10, is that the planar waveguide 10 has a very high loss for short wavelengths. However, by using the optical probe close to an edge of the planar waveguide, e.g., less than a millimeter from the edge, a strong UV light beam can be transferred from the optical probe to the waveguide and emitted from the waveguide for use in the previously described photo curing and photo ablation methods. Using a high power light source with the optical probe also provides the advantage of allowing relatively easy alignment of the optical probe to the planar waveguide 10.

Light for the photo curing and photo ablation methods may also be provided via the optical fiber upon which an alignment dot is placed. In one embodiment, multiple optical fibers may be optically coupled to a common light source. This allows alignment dots to be applied to multiple optical fibers at the same time.

Precise alignment of the optical fiber to the light source is very important to primarily exciting the fundamental mode in the optical fiber. A single mode optical fiber (e.g., at 1550 nm) may be cured or ablated with a light source (e.g., of 630 nm) at a far end of a long (e.g., 100 m) optical fiber. Precise alignment of the optical fiber to the light source may be time consuming; however, this alignment need only be done once. Alignment dots may be sequentially applied to the opposite end of the optical fiber with each of the optical fibers (having an alignment dot) being cut to the desired fiber length.

Although the previous discussion has been focused on using a thermal polymer for the alignment dots, other materials may alternatively be used. For example, a glass or SOL-GEL may be used as alignment dots. In particular, a low melting temperature glass has a high affinity for other glasses, and may be used for coupling and aligning a silica waveguide to an optical fiber, for example.

Figure 5:
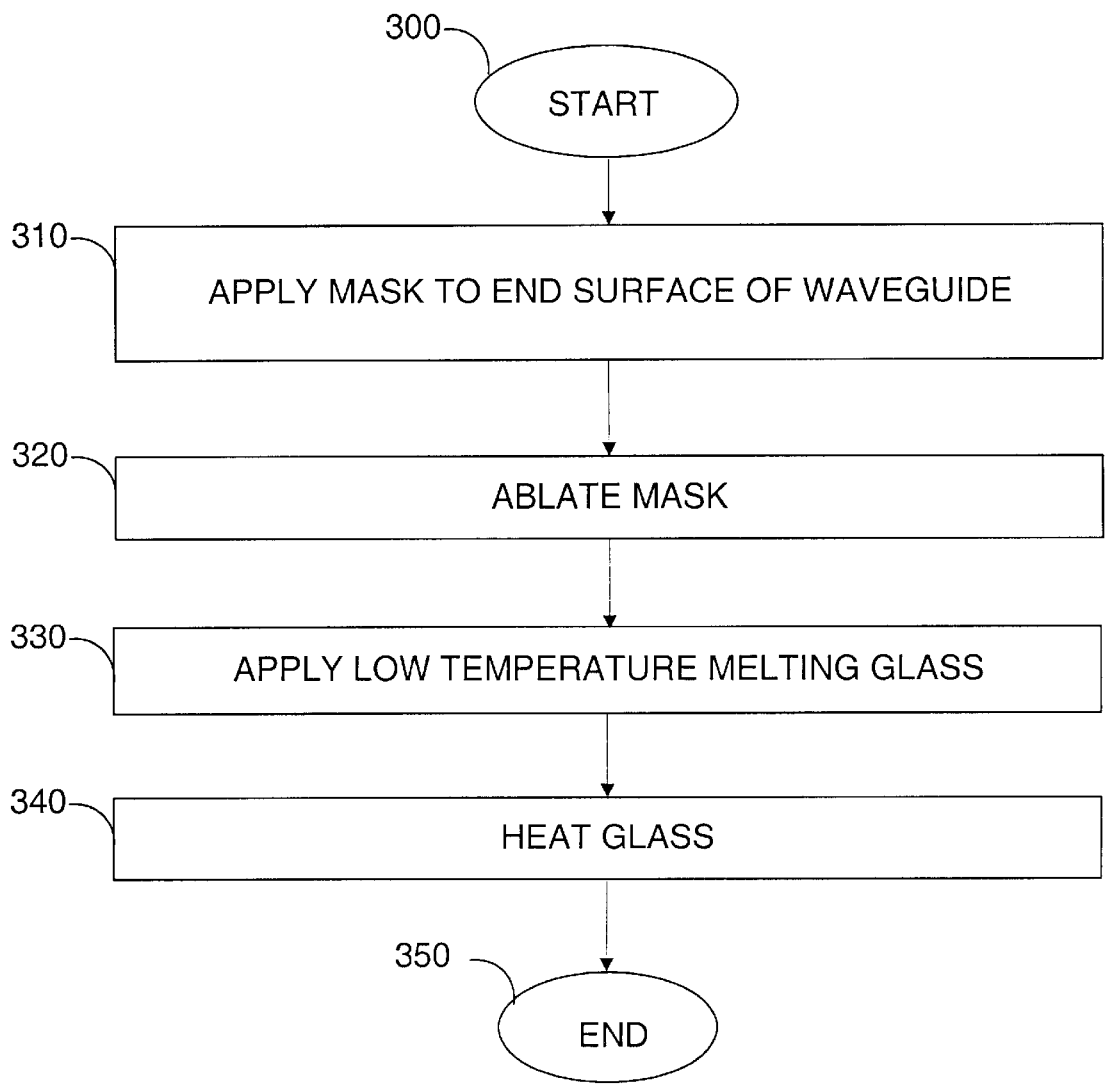
FIG. 5 is a flowchart showing one embodiment of applying an alignment dot comprising glass.

FIG. 5 is a flowchart showing one embodiment of applying an alignment dot comprising glass. The flowcharts starts at block 300, and continues with block 310, at which a mask is applied to the end surface of a waveguide. In one embodiment, a polymer is used as the mask.

From block 310, the flowchart continues at block 320, at which the mask is ablated by a light source, such as a UV light source. At block 330, a glass having a low temperature melting point is applied over the ablation area. In one case, the glass has a melting point of approximately 600° C., and sputtering is used to apply the low temperature melting point glass.

From block 330, the flowchart continues at block 340, at which the glass is heated. In one embodiment, the glass is slowly heated to approximately 650° C. The mask polymer decomposes around 200° C. to 300° C., leaving the glass in the ablation area. The glass melts around 600° C. As the glass melts, it forms a drop. In one case, the decomposed polymer leaves carbon debris over the end surface of the waveguide except at the ablased opening, which assists at centering the glass drop to the ablased area. The flowchart ends at block 350.

Thus, a method of self-aligning two waveguides is disclosed. However, the specific embodiments and methods described herein are merely illustrative. For example, the described methods are easily extendable to aligning multiple waveguides, such as in a fiber ribbon, to multiple waveguides in a planar lightwave circuit. Numerous modifications in form and detail may be made without departing from the scope of the invention as claimed below. The invention is limited only by the scope of the appended claims.

What is claimed is:

1. A method of aligning a first waveguide and a second waveguide, the first and second waveguides each having a core, the first and second waveguides comprised of dissimilar materials, the method comprising:

applying a first alignment dot to an end surface of the core of the first waveguide;

applying a second alignment dot to an end surface of the core of the second waveguide;

positioning the first alignment dot in proximity to the second alignment dot; and melting the first and second alignment dots together.

2. The method of claim 1, wherein applying the first alignment dot to an end surface of the core of the first waveguide further comprises:

applying a photo sensitive optical material to an end surface of the first waveguide;

exposing the photo sensitive optical material to a light beam traveling through the core of the first waveguide, the light beam having a wavelength that cures the photo sensitive optical material to create a first portion of the photo sensitive optical material that is cured and a second portion of the photo sensitive optical material that is not cured;

removing the second portion of the photo sensitive optical material that is not cured.

3. The method of claim 2, wherein removing the second portion of the photo sensitive optical material that is not cured further comprises:

using a solvent to remove the second portion of the photo sensitive optical material that is not cured.

4. The method of claim 2, wherein removing the second portion of the photo sensitive optical material that is not cured further comprises:

using an etch to remove the second portion of the photo sensitive optical material that is not cured.

5. The method of claim 1, wherein applying the first alignment dot to an end surface of the core of the first waveguide further comprises:

applying a mask to an end surface of the first waveguide;

ablating a portion of the mask by exposing the mask to a high energy light beam traveling through the core of the first waveguide to create a mask opening; and filling the mask opening with an optical material to form the first alignment dot.

6. The method of claim 5 further comprising:

removing the mask from the end surface of the first waveguide.

7. The method of claim 1, wherein the first waveguide is an optical fiber.

8. The method of claim 1, wherein the second waveguide is a planar waveguide.

9. The method of claim 1, wherein the first alignment dot comprises a polymer, a sol-gel, or a glass.

10. The method of claim 1 further comprising:

using alignment dots to align an array of optical waveguides.

11. A method of aligning an optical fiber to a planar waveguide, the optical fiber and the planar waveguide each having a core, the method comprising:

applying a first alignment dot to an end surface of the core of the optical fiber;

applying a second alignment dot to an end surface of the core of the planar waveguide;

coupling the first alignment dot to the second alignment dot; and melting the first and second alignment dots together.

12. The method of claim 11 further comprising:

allowing the optical fiber or the planar waveguide to move while melting the first and second alignment dots together.

13. The method of claim 12 further comprising:

applying an additional bonding agent between or around the optical fiber and the planar waveguide.

14. The method of claim 11, wherein the first alignment dot comprises a polymer, a sol-gel, or a glass.

15. The method of claim 11, wherein the second alignment dot comprises a polymer, a sol-gel, or a glass.

16. A method of aligning a first waveguide and a second waveguide, the first waveguide having a core, the core of the first waveguide having a first alignment dot attached to it, the second waveguides having a core, the core of the second waveguide having a second alignment dot attached to it, the first and second waveguides having different cross-sectional shapes, the method comprising:

positioning the first alignment dot in proximity to the second alignment dot; and melting the first and second alignment dots together.

17. The method of claim 16 further comprising:

allowing the first waveguide or the second waveguide to move while melting the first and second alignment dots together.

18. The method of claim 17 further comprising:

using alignment dots to align multiple waveguides at substantially the same time.

19. The method of claim 18 further comprising:

using the alignment dots to align a fiber ribbon.

20. The method of claim 17 further comprising:

applying a bonding agent over the first and second alignment dots to better adhere the first and second waveguides together.

21. The method of claim 17 further comprising:

applying a curable polymer over the first and second alignment dots to better adhere the first and second waveguides together.

22. A method of forming a self-aligning alignment dot on an end surface of a waveguide, the method comprising:

applying a photo sensitive optical material to an end surface of the waveguide, wherein the waveguide is an optical fiber;

exposing the photo sensitive optical material to a light beam traveling through the waveguide, the light beam having a wavelength that cures the photo sensitive optical material to create a cured portion of the photo sensitive optical material and an uncured portion of the photo sensitive optical material;

removing the uncured portion of the photo sensitive optical material;

aligning a far end of the optical fiber to a light source;

forming the self-aligning alignment dot on an opposite end of the optical fiber;

cutting off a segment of optical fiber with the self-aligning alignment dot; and forming another self-aligning alignment dot on the opposite end of the optical fiber without re-aligning the far end of the optical fiber.

23. The method of claim 22, wherein the photo sensitive optical material comprises a polymer or a sol-gel.

24. A method of aligning a first waveguide to a second waveguide comprising:

applying a photo sensitive optical material to an end surface of the first and second waveguides;

exposing the photo sensitive optical material to a first light beam traveling through the first waveguide, the first light beam having a wavelength that cures the photo sensitive optical material to create a first alignment dot;

exposing the photo sensitive optical material to a light beam traveling through the second waveguide, the light beam having a wavelength that cures the photo sensitive optical material to create a second alignment dot;

positioning the first alignment dot in proximity to the second alignment dot; and melting the first alignment dot and the second alignment dot together.

25. The method of claim 24 further comprising:

allowing the first waveguide or the second waveguide to move while melting the first and second alignment dots together.

26. The method of claim 25 further comprising:

applying a bonding agent over the first and second alignment dots to better adhere the first and second waveguides together.

27. The method of claim 25 further comprising:

applying a curable polymer over the first and second alignment dots to better adhere the first and second waveguides together.

* * * * *